United States Patent
Higiro et al.

(10) Patent No.: US 12,458,046 B2
(45) Date of Patent: Nov. 4, 2025

(54) BEVERAGES COMPRISING SIAMENOSIDE I WITH ENHANCED FLAVOR

(71) Applicant: The Coca-Cola Company, Atlanta, GA (US)

(72) Inventors: Juvenal Higiro, Atlanta, GA (US); Yu Shi, Marietta, GA (US); Indra Prakash, Alpharetta, GA (US); Gil Ma, Atlanta, GA (US); Zhu Gao, Sandy Springs, GA (US)

(73) Assignee: The Coca-Cola Company, Atlanta, GA (US)

( * ) Notice: Subject to any disclaimer, the term of this patent is extended or adjusted under 35 U.S.C. 154(b) by 411 days.

(21) Appl. No.: 17/919,878

(22) PCT Filed: Apr. 20, 2021

(86) PCT No.: PCT/US2021/028086
§ 371 (c)(1),
(2) Date: Oct. 19, 2022

(87) PCT Pub. No.: WO2021/216504
PCT Pub. Date: Oct. 28, 2021

(65) Prior Publication Data
US 2023/0157324 A1 May 25, 2023

Related U.S. Application Data

(60) Provisional application No. 63/012,392, filed on Apr. 20, 2020.

(51) Int. Cl.
| | |
|---|---|
| A23L 2/56 | (2006.01) |
| A23L 2/02 | (2006.01) |
| A23L 2/54 | (2006.01) |
| A23L 2/60 | (2006.01) |
| A23L 2/68 | (2006.01) |

(52) U.S. Cl.
CPC .................. *A23L 2/56* (2013.01); *A23L 2/02* (2013.01); *A23L 2/54* (2013.01); *A23L 2/60* (2013.01); *A23L 2/68* (2013.01)

(58) Field of Classification Search
CPC .................. A23L 2/56; A23L 2/60
See application file for complete search history.

(56) References Cited

U.S. PATENT DOCUMENTS

| | | | |
|---|---|---|---|
| 5,433,965 A | 7/1995 | Fischer et al. | |
| 2011/0160311 A1 | 6/2011 | Prakash et al. | |
| 2014/0272068 A1* | 9/2014 | Prakash | A23L 2/56 426/597 |
| 2016/0029678 A1 | 2/2016 | Woodyer et al. | |
| 2018/0000141 A1 | 1/2018 | Hansen et al. | |
| 2018/0116266 A1 | 5/2018 | Jackson | |
| 2018/0258124 A1 | 9/2018 | Mao et al. | |

FOREIGN PATENT DOCUMENTS

| | | |
|---|---|---|
| JP | 2001-211854 | 8/2001 |
| WO | WO 94-18855 | 9/1994 |
| WO | WO 2018/213683 | 11/2018 |
| WO | WO 2018/220103 | 12/2018 |

OTHER PUBLICATIONS

International Search Report for PCT/US2021/028086, issued Jul. 30, 2021.

* cited by examiner

*Primary Examiner* — Jenna A Watts
(74) *Attorney, Agent, or Firm* — King & Spalding

(57) ABSTRACT

Beverages comprising a sweetening amount of rebaudioside M or sucrose and non-sweetening amounts of siamenoside I are provided. Said beverages have improved flavor profiles, including more rounded flavor. Methods of preparing beverages and methods of improving the flavor profile of beverages are also provided.

18 Claims, No Drawings

BEVERAGES COMPRISING SIAMENOSIDE I WITH ENHANCED FLAVOR

CROSS REFERENCE TO RELATED APPLICATIONS

This application is a national phase application under 35 U.S.C. § 371 of International Application No. PCT/US2021/028086, filed Apr. 20, 2021, which claims priority to U.S. Provisional Application No. 63/012,392, filed Apr. 20, 2020. The contents of each of the above-identified applications is hereby fully incorporated herein by reference.

FIELD OF THE INVENTION

The present invention relates generally to beverages comprising certain sweeteners (i.e. rebaudioside M or sucrose) in a sweetening amount and siamenoside I in a non-sweetening amount, wherein the siamenoside I enhances the flavor profile of the beverage when compared to a corresponding beverage that does not contain siamenoside I. The present invention also extends to methods of improving the flavor profile of a beverage sweetened with rebaudioside M or sucrose by adding siamenoside I in a non-sweetening amount.

BACKGROUND OF THE INVENTION

Natural caloric sugars, such as sucrose, fructose and glucose, are used to provide a pleasant taste to beverages, foods, pharmaceuticals, and oral hygienic/cosmetic products. Sucrose, in particular, imparts a taste preferred by consumers. Although sucrose provides superior sweetness characteristics, it is disadvantageously caloric.

Consumers increasingly prefer non-caloric or low caloric sweeteners have been introduced to satisfy consumer demand. However, non- and low caloric sweeteners differ from natural caloric sugars in ways that frustrate consumers. On a taste basis, non-caloric or low caloric sweeteners exhibit a temporal profile, maximal response, flavor profile, mouth feel, and/or adaptation behavior that differ from sugar. Specifically, non-caloric or low caloric sweeteners exhibit delayed sweetness onset, lingering sweet aftertaste, bitter taste, metallic taste, astringent taste, cooling taste and/or licorice-like taste. On a source basis, many non-caloric or low caloric sweeteners are synthetic chemicals. Consumer desire remains high for natural non-caloric or low caloric sweeteners that tastes like sucrose.

Rebaudioside M, one of many diterpene glycosides found in the leaves of *Stevia rebaudiana* varieties, has been identified as a desirable natural, non-caloric sweetener that can achieve high maximal sweetness in beverages, e.g. the 10 Brix required for traditional carbonated soft drinks. However, rebaudioside M still suffers from undesirable flavor attributes that make rebaudioside M-sweetened beverages distinguishable from sucrose-sweetened beverages. Accordingly, there remains a need for alternative sweetener systems that provide desirable flavor profiles.

SUMMARY OF THE INVENTION

In a first aspect, the present invention relates to a beverage comprising (i) a sweetening amount of a sweetener selected from rebaudioside M and sucrose and (ii) a non-sweetening amount of siamenoside I. The concentration of rebaudioside M can be from about 50 ppm to about 600 ppm, such as from about 250 ppm to about 500 ppm. When the sweetener is sucrose, the beverage can comprise at least 8% sucrose by weight. The concentration of siamenoside I in the beverage can be from about 1 ppm to about 24 ppm.

The beverage can be any carbonated or non-carbonated beverage. In a particular embodiment, the beverage is a carbonated soft drink. In another particular embodiment, the beverage matrix of the beverage comprises citric acid or phosphoric acid.

The beverage can be selected from a zero-calorie, low-calorie, mid-calorie or full-calorie beverage.

In certain embodiments, the beverages of the present invention have improved flavor profiles compared to corresponding beverages without siamenoside I. For example, the beverages of the present invention have more rounded flavor compared to a corresponding beverage that does not contain siamenoside I.

In a second aspect, the present invention provides a method of preparing a beverage comprising mixing a beverage syrup with a diluting quantity of water, wherein the beverage syrup comprises (i) a sweetening amount of a sweetener selected from rebaudioside M and sucrose and (ii) a non-sweetening amount of siamenoside I.

In a third aspect, the present invention provides a method of preparing a beverage comprising dissolving (i) a sweetening amount of rebaudioside M or a sweetening amount of sucrose and (ii) a non-sweetening amount of siamenoside I in (iii) a beverage matrix.

In a fourth aspect, the present invention provides a method of improving the flavor profile of a beverage sweetened with either rebaudioside M or sucrose by adding siamenoside I in a non-sweetening amount to said beverage, wherein addition of siamenoside I improves one or more flavor attributes of the beverage compared to a corresponding beverage without siamenoside I, wherein the one or more flavor attributes are selected from the group consisting of bitterness, astringency, licorice notes, sweetness linger, bitterness linger, bitterness aftertaste, metallic aftertaste and chemical aftertaste.

In a fifth aspect, the present invention provides a method of providing a more rounded flavor to a beverage sweetened with either rebaudioside M or sucrose by adding siamenoside I in a non-sweetening amount to said beverage.

DETAILED DESCRIPTION OF THE INVENTION

I. Definitions

The term "astringency", as used herein, refers to a perception puckering and dryness in the palate and is known to build in intensity and become increasingly difficult to clear from the mouth over repeated exposures. Astringency is a dry sensation experienced in the mouth and is commonly explained as arising from the loss of lubricity owing to the precipitation of proteins from the salivary film that coats and lubricates the oral cavity. Astringency is not confined to a particular region of the mouth but is a diffuse surface phenomenon, characterized by a loss of lubrication.

The term "bitter" or "bitter taste", as used herein, refers to the perception or gustatory sensation resulting following the detection of a bitter tastant. The following attributes may contribute to bitter taste: astringent, bitter-astringent, metallic, bitter-metallic, as well as off-tastes, aftertastes and undesirable tastes including but not limited to freezer-burn and card-board taste, and/or any combinations of these. It is noted that, in the art, the term "off-taste" is often synonymous with "bitter taste. Bitterness of substances can be compared with bitter taste threshold of quinine which is 1. (Guyton, Arthur C. (1991) Textbook of Medical Physiology. (8th ed). Philadelphia: W.B. Saunders; McLaughlin S., Margolskee R. F. (1994). "The Sense of Taste". American Scientist. 82 (6): 538-545.). Bitterness can be tested using a panel of subjects or in vitro, for example using a taste receptor cell line.

The term "flavor enhancer", as used herein, refers to a compound that positively impacts the perception of a non-sucrose sweetener in a consumable (e.g. a beverage) in such a way that the consumable tastes more like a sucrose-sweetened beverage. For example, certain negative taste properties of non-sucrose sweeteners can be reduced or eliminated with flavor enhancers, e.g. bitterness, sourness, astringency, saltiness and metallic notes. In another example, a flavor enhancer improves the mouthfeel of a beverage. In yet another example, a flavor enhancer improves the roundedness of a beverage.

The term "flavor profile," as generally used herein, refers to the intensity of various flavor/taste attributes of a beverage. Exemplary flavor/taste attributes are sweetness intensity, bitterness intensity, salty intensity, licorice intensity, cooling intensity, and licorice intensity. Methods of determining the flavor profile of a given sweetener or sweetened composition are known in the art.

The term "licorice," as used herein, refers to a sweet, semi-sweet, bitter, and/or aromatic taste of a sweetener or sweetened composition.

The term "mouthfeel", as used herein, refers to the sensory and tactile properties of the consumable perceived when the composition contacts the mouth cavity and surfaces. The sensory and tactile properties include the texture, thickness, consistency and body.

The term "roundedness" or "rounded flavor", as used herein, refers to a flavor profile that lacks sharp, harsh or unpleasant sensations. Beverages that have rounded flavor can also be described as "balanced."

The term "sour" or "sourness", as used herein, refers to a taste that detects acidity. It is caused by a hydrogen atom, or ions. The more atoms present in a food, the sourer it will taste. The sourness of substances is rated relative to dilute hydrochloric acid, which has a sourness index of 1. By comparison, tartaric acid has a sourness index of 0.7, citric acid an index of 0.46, and carbonic acid an index of 0.06. A reduction in sour taste can be expressed as percentage sour taste inhibition.

The term "sugar-like characteristic" refers to any characteristic similar to that of sucrose and include, but are not limited to, maximal response, flavor profile, taste profile, temporal profile, adaptation behavior, mouthfeel, concentration/response function, tastant/and flavor/sweet taste interactions, spatial pattern selectivity, and temperature effects. These characteristics are dimensions in which the taste of sucrose is different from the tastes of other compounds.

The term "sweetening amount", as used herein, refers to the amount of compound required to provide detectable sweetness when present in a beverage. A sweetener is present in a "sweetening amount" when it is above its sweetness recognition threshold concentration.

The term "sweetness recognition threshold concentration," as used herein, is the lowest known concentration of a compound that is perceivable by the human sense of taste as sweet. The sweetness recognition threshold concentration is specific for a particular compound, and can vary based on temperature, matrix, ingredients and/or flavor system.

II. Beverages

In one aspect, the present invention relates to a beverage comprising (i) a sweetening amount of a sweetener selected from rebaudioside M and sucrose and (ii) a non-sweetening amount of siamenoside I. It has been found, surprisingly, that use of low levels of siamenoside I (i.e., non-sweetening amounts of siamenoside I) influences the flavor profile of rebaudioside M- and sucrose-sweetened beverages in a positive manner, improving the flavor profiles of the beverages and providing a more rounded or balanced flavor profile.

In some embodiments, the sweetener is rebaudioside M. The amount of rebaudioside M in the beverage can vary from about 50 ppm to about 600 ppm, such as, for example, from about 50 ppm to about 500 ppm, from about 50 ppm to about 400 ppm, from about 50 ppm to about 300 ppm, from about 50 ppm to about 200 ppm, from about 50 ppm to about 100 ppm, from about 100 ppm to about 600 ppm, from about 100 ppm to about 500 ppm, from about 100 ppm to about 400 ppm, from about 100 ppm to about 300 ppm, from about 100 ppm to about 200 ppm, from about 200 ppm to about 600 ppm, from about 200 ppm to about 500 ppm, from about 200 ppm to about 400 ppm, from about 200 ppm to about 300 ppm, from about 300 ppm to about 600 ppm, from about 300 ppm to about 500 ppm, from about 300 ppm to about 400 ppm, from about 400 ppm to about 600 ppm, from about 400 ppm to about 500 ppm and from about 500 ppm to about 600 ppm.

In particular embodiments, the concentration of rebaudioside M is from about 250 ppm to about 500 ppm, such as, for example, from about 250 ppm to about 300 ppm, from about 300 ppm to about 350 ppm, from about 350 ppm to about 400 ppm and from about 450 ppm to about 500 ppm.

The sweetness of the rebaudioside-sweetened beverage (without siamenoside I) can also be expressed in terms of its sucrose equivalence (SE). The sucrose equivalence of rebaudioside M-sweetened beverages of the present invention is at least 8% sucrose equivalence, such as, for example, at least 9% sucrose equivalence, at least 10% sucrose equivalence, at least 11% sucrose equivalence, at least 12% sucrose equivalence or at least 13% sucrose equivalence.

In another embodiment, the sucrose equivalence of the rebaudioside M-sweetened beverage is from about 8% to about 14%, such as, for example, from about 8% to about 12% or from about 8% to about 10%.

The rebaudioside M can be provided as a purified compound (i.e. >99% by weight in a composition) or as part of a mixture. Exemplary mixtures include enhanced *stevia* extracts and steviol glycoside mixtures. In exemplary embodiments, the steviol glycoside mixture comprises at least about 50% rebaudioside M by weight, such as, for example, from about 50% to about 90%, from about 50% to about 80%, from about 50% to about 70%, from about 50% to about 60%, from about 60% to about 90%, from about 60% to about 80%, from about 60% to about 70%, from about 70% to about 90%, from about 70% to about 80% and from about 80% to about 90%. In still further embodiments, the steviol glycoside mixture contains rebaudioside M in an amount greater than about 80%, greater than about 90%, or greater than about 95% by weight on a dry basis, for example, greater than about 91%, greater than about 92%, greater than about 93%, greater than about 94%, greater than about 95%, greater than about 96%, greater than about 97% and greater than about 98%.

In other embodiments, the sweetener is sucrose. The beverages of the present invention contain at least 4% sucrose by weight, at least 5% sucrose by weight, at least 6% sucrose by weight, at least 7% sucrose by weight, at least 8% sucrose by weight, at least 9% sucrose by weight, at least 10% sucrose by weight, at least 11% sucrose by weight, at least 12% sucrose by weight, at least 13% sucrose by weight or at least 14% sucrose by weight. In certain embodiments, the beverage contains from about 8% to about 14% sucrose by weight, such as, for example, from about 8% to about 12% or about 8% to about 10%.

The sweetness of a sucrose-sweetened beverage is described in degrees Brix (i.e. °Brix or °Bx). The sweetness of the sucrose-sweetened beverages of the present invention (including siamenoside I) is at least 4° Bx, at least 5° Bx, at least 6° Bx, at least 7° Bx, at least 8° Bx, at least 9° Bx, at least 10° Bx, at least 11° Bx, at least 12° Bx, at least 13° Bx or at least 14° Bx. In a particular embodiment, the sweetness of a sucrose-sweetened beverage is at least 8° Bx.

In another embodiment, the sweetness of the sucrose-sweetened beverage is from about 8° Bx to about 14° Bx, such as, for example, from about 8° Bx to about 12° Bx or from about 8° Bx to about 10° Bx.

In still another embodiment, the sweetness of the sucrose-sweetened beverage is 4° Bx, 5° Bx, 6° Bx, 7° Bx, 8° Bx, 9° Bx, 10° Bx, 11° Bx, 12° Bx, 13° Bx or 14° Bx.

Siamenoside I is a mogroside, initially isolated from *Siraitia siamensis* (Kasai, R. et al., *Agric. Biol. Chem.* 1989, 53, 3347-3349) and later, from *Siraitia grosvenorii* (Luo han guo) (Matsumoto, K. et al, *Chem. Pharm. Bull.* 1990, 38, 2030-2032). Siamenoside I for use in the present invention can be prepared by any suitable means, including but not limited to synthesis, biosynthesis or extraction.

Methods for synthesis of mogrosides including siamenoside are known in the art. As one example, U.S. Patent Publication No. US 2014/0308698, which is incorporated herein by reference, describes methods for enzymatic synthesis of mogrosides, including siamenoside I. In other embodiments, the siamenoside I is extracted from fruit.

Siamenoside I may be provided in a purified form (i.e. >99% by weight) or as a component of a mixture containing siamenoside I and one or more additional components, e.g. luo han guo. In certain other embodiments, the siamenoside is derived from enzymatic conversion of an alternate starting material, such as for example through fermentation using a bioreactor. In certain other embodiments the siamenoside is derived from enzymatic or microbial conversion of luo han guo.

The mixture comprises siamenoside I in an amount that ranges from about 50% to about 99%, from about 60% to about 99%, from about 70% to about 99%, from about 80% to about 99% and from about 90% to about 99%. In still further embodiments, the mixture contains siamenoside I in an amount greater than about 80%, greater than about 90%, or greater than about 95% by weight on a dry basis, for example, greater than about 91%, greater than about 92%, greater than about 93%, greater than about 94%, greater than about 95%, greater than about 96%, greater than about 97% and greater than about 98%.

In one embodiment, siamenoside I is provided in the absence of other mogrosides, including but not limited to mogroside V.

In the present beverages, siamenoside I is used in a non-sweetening amount, i.e. a concentration that is not detectably sweet. It is accepted that ~1.5% sucrose equivalence is the lower limit of detectable sweetness in humans. It is also known that the sweetness recognition threshold concentration of a particular compound varies depending on the type of beverage and/or beverages matrix.

In certain embodiments, siamenoside I is present in concentrations from about 1 ppm to about 24 ppm, such as, for example, from about 5 ppm to about 24 ppm, from about 10 ppm to about 24 ppm, from about 15 ppm to about 24 ppm, from about 20 ppm to about 24 ppm, from about 1 ppm to about 20 ppm, from about 5 ppm to about 20 ppm, from about 5 ppm to about 15 ppm, from about 5 ppm to about 10 ppm, from about 10 ppm to about 20 ppm, from about 10 ppm to about 15 ppm or from about 15 ppm to about 20 ppm. In a particular embodiment, the concentration of siamenoside I is from 18 ppm to 24 ppm, from 19 ppm to 24 ppm, from 20 ppm to 24 ppm, from 21 ppm to 24 ppm, from 22 ppm to 24 ppm or from 23 ppm to 24 ppm.

Beverages of the present invention include carbonated and non-carbonated beverages.

Carbonated beverages include, but are not limited to, frozen carbonated beverages, enhanced sparkling beverages, cola, fruit-flavored sparkling beverages (e.g. lemon-lime, orange, grape, strawberry and pineapple), ginger-ale, soft drinks and root beer.

Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, café au lait, milk tea, fruit milk beverages), beverages containing cereal extracts and smoothies.

In a particular embodiment, the beverage of the present invention is a carbonated soft drink. In a more particular embodiment, the beverage of the present invention is a fruit-flavored carbonated soft drink. In an even more particular embodiment, the beverage of the present invention is a lemon-lime flavored carbonated soft drink.

Beverages comprise a matrix, i.e. the basic ingredient in which the beverage ingredients of the present invention are dissolved. In one embodiment, a beverage comprises water of beverage quality as the matrix, such as, for example deionized water, distilled water, reverse osmosis water, carbon-treated water, purified water, demineralized water and combinations thereof, can be used. Additional suitable matrices include, but are not limited to phosphoric acid, phosphate buffer, citric acid, citrate buffer and carbon-treated water.

In a particular embodiment, the beverage of the present invention comprises a beverage matrix comprising citric acid. In another particular embodiment, the beverage of the present invention comprises a beverage matrix comprising phosphoric acid.

It is contemplated that the pH of the beverage does not materially or adversely affect the taste of the sweetener. A non-limiting example of the pH range of the beverage may be from about 1.8 to about 10. A further example includes a pH range from about 2 to about 5. In a particular embodiment, the pH of beverage can be from about 2.5 to about 4.2. One of skill in the art will understand that the pH of the beverage can vary based on the type of beverage. Dairy beverages, for example, can have pHs greater than 4.2.

The titratable acidity of a beverage may, for example, range from about 0.01 to about 1.0% by weight of beverage.

In one embodiment, the sparkling beverage product has an acidity from about 0.01 to about 1.0% by weight of the beverage, such as, for example, from about 0.05% to about 0.25% by weight of beverage.

The carbonation of a sparkling beverage product has 0 to about 2% (w/w) of carbon dioxide or its equivalent, for example, from about 0.1 to about 1.0% (w/w).

The beverage can be caffeinated or non-caffeinated.

The temperature of a beverage may, for example, range from about 4° C. to about 100° C., such as, for example, from about 4° C. to about 25° C.

The beverage can be a full-calorie beverage that has up to about 120 calories per 8 oz. serving.

The beverage can be a mid-calorie beverage that has up to about 60 calories per 8 oz. serving.

The beverage can be a low-calorie beverage that has up to about 40 calories per 8 oz. serving.

The beverage can be a zero-calorie that has less than about 5 calories per 8 oz. serving.

In one particular embodiment, a beverage comprises rebaudioside M in a sweetening amount and siamenoside I in a non-sweetening amount.

In a more particular embodiment, a beverage comprises rebaudioside M in a concentration from about 50 ppm to about 600 ppm and siamenoside I in a concentration from about 1 ppm to about 24 ppm. In a further particular embodiment, a beverage comprises rebaudioside M in a concentration from about 50 ppm to about 600 ppm and siamenoside I a concentration from about 15 ppm to about 24 ppm. In a yet further particular embodiment, a beverage comprises rebaudioside M in a concentration from about 50 ppm to about 600 ppm and siamenoside I in a concentration from about 20 ppm to about 24 ppm.

In another more particular embodiment, a beverage comprises rebaudioside M in a concentration from about 250 ppm to about 500 ppm and siamenoside I in a concentration from about 1 ppm to about 24 ppm. In a further particular embodiment, a beverage comprises rebaudioside M in a concentration from about 250 to about 500 ppm and siamenoside I in a concentration from about 15 ppm to about 24 ppm. In a yet further particular embodiment, a beverage comprises rebaudioside M in a concentration from about 250 ppm to about 600 ppm and siamenoside I in a concentration from about 20 ppm to about 24 ppm.

In another embodiment, a beverage comprises sucrose in a sweetening amount and siamenoside I in a non-sweetening amount.

In a more particular embodiment, a beverage comprises at least 8% sucrose by weight and siamenoside I in a concentration from about 1 ppm to about 24 ppm. In a further particular embodiment, a beverage comprises at least 8% sucrose by weight and siamenoside I in a concentration from about 15 ppm to about 24 ppm. In a yet further particular embodiment, a beverage comprises at least 8% sucrose by weight and siamenoside I in a concentration from about 20 ppm to about 24 ppm.

In another more particular embodiment, a beverage comprises from about 8% to about 10% sucrose by weight and siamenoside I in a concentration from about 1 ppm to about 24 ppm. In a further particular embodiment, a beverage comprises from about 8% to about 10% sucrose by weight and siamenoside I in a concentration from about 15 ppm to about 24 ppm. In a yet further particular embodiment, a beverage comprises from about 8% to about 10% sucrose by weight and siamenoside I in a concentration from about 20 ppm to about 24 ppm.

The beverages of the present invention have improved flavor profiles compared to a corresponding beverage without siamenoside I. The flavor profile of a sweetener is a quantitative profile of the relative intensities of all of the taste attributes exhibited. Such profiles often are plotted as histograms or radar plots.

The beverages of the present invention have exhibit one or more improved (i.e. reduced) negative flavor attributes or taste attributes compared to a corresponding beverage without siamenoside I. For example, beverages of the present invention have one or more of the following: reduced bitterness, reduced astringency, reduced licorice notes, reduced sweetness linger, reduced bitterness linger, reduced bitterness aftertaste, reduced metallic aftertaste, reduced chemical aftertaste.

The beverages of the present invention have a more rounded flavor (balanced flavor) compared to a corresponding beverage without siamenoside I.

In some embodiments, the sweeteners specified in the present beverages (i.e. sucrose or rebaudioside M) are the sole sweetener in the beverage, i.e. the only sweetener present in a sweetening amount. In other embodiments, the beverage comprises at least one additional sweetener, wherein the at least one additional sweetener is also present in a sweetening amount. The at least one additional sweetener can be any known sweetener, e.g. a natural sweetener (including natural high potency sweeteners), a synthetic sweetener, or a caloric sweetener.

For example, the at least one additional sweetener can be a carbohydrate sweetener. Suitable carbohydrate sweeteners are selected from, but not limited to, the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose, sialose and combinations thereof.

The at least one additional sweetener can also be selected from a rare sugar, e.g. sorbose, lyxose, ribulose, xylose, xylulose, D-allose, L-ribose, D-tagatose, L-glucose, L-fucose, L-arabinose, turanose and combinations thereof.

The at least one additional sweetener may be other steviol glycosides or mogrosides, or compositions containing steviol glycosides or mogrosides.

Exemplary steviol glycoside sweeteners include, but are not limited to, rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside J, rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides, *stevia* extracts and combinations thereof.

Exemplary mogroside sweeteners include, but are not limited to, grosmogroside I, mogroside IA, mogroside IE, II-oxomogroside IA, mogroside II, mogroside II A, mogroside II B, mogroside II E, 7-oxomogroside II E, mogroside III, Mogroside Me, II-oxomogroside IIIE, II-deoxymogroside III, mogroside IV, Mogroside IVA II-oxomogroside IV, II-oxomogroside IVA, mogroside V, isomogroside V, II-deoxymogroside V, 7-oxomogroside V, II-oxomogroside V, isomogroside V, mogroside VI, mogrol, 11-oxomogrol, an isomer of siamenoside I (e.g. those disclosed in 20170119032; incorporated by reference in its entirety), in particular the 1,6-α isomer of siamenoside I, luo han guo, mogroside mixtures and combinations thereof.

Other sweeteners include monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I, sugar alcohols such as erythritol, sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof.

The beverage of the present invention can contain additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, caffeine, flavorants and flavoring ingredients, astringent compounds, proteins or protein hydrolysates, surfactants, emulsifiers, weighing agents, juice, dairy, cereal and other plant extracts, flavonoids, alcohols, polymers and combinations thereof. Any suitable additive described herein can be used.

In one embodiment, the beverage further comprises one or more polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

Suitable amino acid additives include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid ($\alpha$-, $\beta$-, and/or $\delta$-isomers), glutamine, hydroxyproline, taurine, norvaline, sarcosine, and their salt forms such as sodium or potassium salts or acid salts. The amino acid additives also may be in the D- or L-configuration and in the mono-, di-, or tri-form of the same or different amino acids. Additionally, the amino acids may be $\alpha$-, $\beta$-, $\gamma$- and/or $\delta$-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-$\alpha$-lysine or poly-L-$\epsilon$-lysine), poly-L-ornithine (e.g., poly-L-$\alpha$-ornithine or poly-L-$\epsilon$-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be $\alpha$-, $\beta$-, $\gamma$-, $\delta$-, and $\epsilon$-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-$\alpha$-lysine with a MW of 1,500, MW of 6,000, MW of 25,200, MW of 63,000, MW of 83,000, or MW of 300,000.

In particular embodiments, the amino acid is present in the consumable in an amount from about 10 ppm to about 50,000 ppm. In another embodiment, the amino acid is present in the consumable in an amount from about 1,000 ppm to about 10,000 ppm, such as, for example, from about 2,500 ppm to about 5,000 ppm or from about 250 ppm to about 7,500 ppm.

Suitable sugar acid additives include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfonyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In particular embodiments, the organic acid additive is present in the sweetener composition in an amount effective to provide a concentration from about 10 ppm to about 5,000 ppm when present in a consumable, such as, for example, a beverage.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

The inorganic acid additive is present in the consumable in a concentration from about 25 ppm to about 25,000 ppm.

Suitable bitter compound additives include, but are not limited to, caffeine, quinine, urea, bitter orange oil, naringin, quassia, and salts thereof.

The bitter compound is present in the consumable in a concentration from about 25 ppm to about 25,000 ppm.

Suitable flavorants and flavoring ingredient additives include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Döhler™ Natural Flavoring Sweetness Enhancer K14323 (Döhler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, California, U.S.A.).

The flavorant is present in the consumable in a concentration from about 0.1 ppm to about 4,000 ppm.

Suitable polymer additives include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

The polymer is present in the consumable a concentration from about 30 ppm to about 2,000 ppm.

Suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

The protein hydrolysate is present in the consumable in a concentration from about 200 ppm to about 50,000 ppm.

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

The surfactant additive is present in the consumable in a concentration from about 30 ppm to about 2,000 ppm.

Suitable flavonoid additives are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

The flavonoid additive is present in the consumable in a concentration from about 0.1 ppm to about 1,000 ppm.

Suitable alcohol additives include, but are not limited to, ethanol. In particular embodiments, the alcohol additive is present in the consumable in a concentration from about 625 ppm to about 10,000 ppm.

Suitable astringent compound additives include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols). The astringent additive is present in the consumable in a concentration from about 10 ppm to about 5,000 ppm.

The beverages of the present invention can also contain one or more functional ingredients, which provide a real or perceived heath benefit to the composition. Functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

Examples of suitable antioxidants for embodiments of this invention include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone, phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-α-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), *aronia* extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this invention include, but are not limited to, fruits, vegetables, tea, cocoa, chocolate, spices, herbs, rice, organ meats from livestock, yeast, whole grains, or cereal grains.

Particular antioxidants belong to the class of phytonutrients called polyphenols (also known as "polyphenolics"), which are a group of chemical substances found in plants, characterized by the presence of more than one phenol group per molecule. Suitable polyphenols for embodiments of this invention include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, and combinations thereof.

In particular embodiments, the antioxidant is a catechin such as, for example, epigallocatechin gallate (EGCG). Suitable sources of catechins for embodiments of this invention include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this invention include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is an anthocyanin. Suitable sources of anthocyanins for embodiments of this invention include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this invention include, but are not limited to, red apples, onions, kale, bog whortleberry, lingonberrys, chokeberry, cranberry, blackberry, blueberry, strawberry, raspberry, black currant, green tea, black tea, plum, apricot, parsley, leek, broccoli, chili pepper, berry wine, and ginkgo.

In some embodiments, the antioxidant is reservatrol. Suitable sources of reservatrol for embodiments of this invention include, but are not limited to, red grapes, peanuts, cranberry, blueberry, bilberry, mulberry, Japanese Itadori tea, and red wine.

In particular embodiments, the antioxidant is an isoflavone. Suitable sources of isoflavones for embodiments of this invention include, but are not limited to, soy beans, soy products, legumes, alfalfa sprouts, chickpeas, peanuts, and red clover.

In some embodiments, the antioxidant is curcumin. Suitable sources of curcumin for embodiments of this invention include, but are not limited to, turmeric and mustard.

In particular embodiments, the antioxidant is chosen from punicalagin, ellagitannin or combinations thereof. Suitable sources of punicalagin and ellagitannin for embodiments of this invention include, but are not limited to, pomegranate, raspberry, strawberry, walnut, and oak-aged red wine.

In some embodiments, the antioxidant is a citrus flavonoid, such as hesperidin or naringin. Suitable sources of citrus flavonoids, such as hesperidin or naringin, for embodiments of this invention include, but are not limited to, oranges, grapefruits, and citrus juices.

In particular embodiments, the antioxidant is chlorogenic acid. Suitable sources of chlorogenic acid for embodiments of this invention include, but are not limited to, green coffee, yerba mate, red wine, grape seed, red grape skin, purple grape skin, red grape juice, purple grape juice, apple juice, cranberry, pomegranate, blueberry, strawberry, sunflower, *Echinacea*, pycnogenol, and apple peel.

Suitable dietary fibers include, but are not limited to, non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof.

Food sources of dietary fiber include, but are not limited to, grains, legumes, fruits, and vegetables. Grains providing dietary fiber include, but are not limited to, oats, rye, barley, wheat. Legumes providing fiber include, but are not limited to, peas and beans such as soybeans. Fruits and vegetables providing a source of fiber include, but are not limited to, apples, oranges, pears, bananas, berries, tomatoes, green beans, broccoli, cauliflower, carrots, potatoes, celery. Plant foods such as bran, nuts, and seeds (such as flax seeds) are also sources of dietary fiber. Parts of plants providing dietary fiber include, but are not limited to, the stems, roots, leaves, seeds, pulp, and skin.

Fatty acids any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, "long chain polyunsaturated fatty acid" refers to any polyunsaturated carboxylic acid or organic acid with a long aliphatic tail. Suitable omega-3 fatty acids include, but are not limited to, linolenic acid, alpha-linolenic acid, eicosapentaenoic acid, docosahexaenoic acid, stearidonic acid, eicosatetraenoic acid and combinations thereof. Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid and combinations thereof. Suitable esterified fatty acids for embodiments of the present invention include, but are not limited to, monoacylglycerols containing omega-3 and/or omega-6 fatty acids, diacylglycerols containing omega-3 and/or omega-6 fatty acids, or triacylglycerols containing omega-3 and/or omega-6 fatty acids and combinations thereof.

Suitable vitamins include, vitamin A, vitamin D, vitamin E, vitamin K, vitamin B1, vitamin B2, vitamin B3, vitamin B5, vitamin B6, vitamin B7, vitamin B9, vitamin B12, and vitamin C. Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins.

Minerals are selected from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In other particular embodiments of this invention, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

Preservatives are selected from antimicrobials, antioxidants, antienzymatics or combinations thereof. Non-limiting examples of antimicrobials include sulfites, propionates, benzoates, sorbates, nitrates, nitrites, bacteriocins, salts, sugars, acetic acid, dimethyl dicarbonate (DMDC), ethanol, and ozone. Sulfites include, but are not limited to, sulfur dioxide, sodium bisulfite, and potassium hydrogen sulfite. Propionates include, but are not limited to, propionic acid, calcium propionate, and sodium propionate. Benzoates include, but are not limited to, sodium benzoate and benzoic acid. Sorbates include, but are not limited to, potassium sorbate, sodium sorbate, calcium sorbate, and sorbic acid. Nitrates and nitrites include, but are not limited to, sodium nitrate and sodium nitrite. In yet another particular embodiment, the at least one preservative is a bacteriocin, such as, for example, nisin. In another particular embodiment, the preservative is ethanol. In still another particular embodiment, the preservative is ozone. Antienzymatics suitable for use as preservatives in particular embodiments of the invention include ascorbic acid, citric acid, and metal chelating agents such as ethylenediaminetetraacetic acid (EDTA).

Hydration products can be electrolytes, non-limiting examples of which include sodium, potassium, calcium, magnesium, chloride, phosphate, bicarbonate, and combinations thereof. Suitable electrolytes for use in particular embodiments of this invention are also described in U.S. Pat. No. 5,681,569, the disclosure of which is expressly incorporated herein by reference. Non-limiting examples of salts for use in particular embodiments include chlorides, carbonates, sulfates, acetates, bicarbonates, citrates, phosphates, hydrogen phosphates, tartrates, sorbates, citrates, benzoates, or combinations thereof. In particular embodiments of this invention, the hydration product is a carbohydrate to supplement energy stores burned by muscles. Suitable carbohydrates for use in particular embodiments of this invention are described in U.S. Pat. Nos. 4,312,856, 4,853,237, 5,681,569, and 6,989,171, the disclosures of which are expressly incorporated herein by reference. Non-limiting examples of suitable carbohydrates include monosaccharides, disaccharides, oligosaccharides, complex polysaccharides or combinations thereof. Non-limiting examples of suitable types of monosaccharides for use in particular embodiments include trioses, tetroses, pentoses, hexoses, heptoses, octoses, and nonoses. Non-limiting examples of specific types of suitable monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, and sialose. Non-limiting examples of suitable disaccharides include sucrose, lactose, and maltose. Non-limiting examples of suitable oligosaccharides include saccharose, maltotriose, and maltodextrin. In other particular embodiments, the carbohydrates are provided by a corn syrup, a beet sugar, a cane sugar, a juice, or a tea. In another particular embodiment, the hydration is a flavanol that provides cellular rehydration. Non-limiting examples of suitable flavanols for use in particular embodiments of this invention include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. In a particular embodiment, the hydration product is a glycerol solution to enhance exercise endurance.

Probiotics comprise microorganisms that benefit health when consumed in an effective amount. Probiotics may include, without limitation, bacteria, yeasts, and fungi. Examples of probiotics include, but are not limited to, bacteria of the genus Lactobacilli, Bifidobacteria, Streptococci, or combinations thereof. In particular embodiments of the invention, the at least one probiotic is chosen from the genus Lactobacilli. Lactobacilli (i.e., bacteria of the genus *Lactobacillus*, hereinafter "L."). Non-limiting examples of species of Lactobacilli found in the human intestinal tract include *L. acidophilus, L. casei, L. fermentum*, L. salivaroes, *L. brevis, L. leichmannii, L. plantarum, L. cellobiosus, L. reuteri, L. rhamnosus*, L. GG, *L. bulgaricus*, and *L. thermophilus*. According to other particular embodiments of this invention, the probiotic is chosen from the genus Bifidobacteria. Non-limiting species of Bifidobacteria found in the human gastrointestinal tract include *B. angulatum, B. animalis, B. asteroides, B. bifidum, B. bourn, B. breve, B.*

*catenulatum, B. choerinum, B. coryneforme, B. cuniculi, B. dentium, B. gallicum, B. gallinarum, B indicum, B. longum, B. magnum, B. merycicum, B. minimum, B. pseudocatenulatum, B. pseudolongum, B. psychraerophilum, B. pullorum, B. ruminantium, B. saeculare, B. scardovii, B. simiae, B. subtile, B. thermacidophilum, B. thermophilum, B. urinalis,* and B. sp. According to other particular embodiments of this invention, the probiotic is chosen from the genus *Streptococcus. Streptococcus thermophilus* is a gram-positive facultative anaerobe. Other non-limiting probiotic species of this bacteria include *Streptococcus* salivarus and *Streptococcus cremoris.*

Prebiotics are compositions that promote the growth of beneficial bacteria in the intestines. Prebiotics include, without limitation, mucopolysaccharides, oligosaccharides, polysaccharides, amino acids, vitamins, nutrient precursors, proteins and combinations thereof. According to a particular embodiment of this invention, the prebiotic is chosen from dietary fibers, including, without limitation, polysaccharides and oligosaccharides. Non-limiting examples of oligosaccharides that are categorized as prebiotics in accordance with particular embodiments of this invention include fructooligosaccharides, inulins, isomalto-oligosaccharides, lactilol, lactosucrose, lactulose, pyrodextrins, soy oligosaccharides, transgalacto-oligosaccharides, and xylo-oligosaccharides. According to other particular embodiments of the invention, the prebiotic is an amino acid.

As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" describes macronutrients, herbal extracts, exogenous hormones, anorectics, anorexigenics, pharmaceutical drugs, and combinations thereof, that when delivered in an effective amount, suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in an effective amount, activate or otherwise enhance a person's thermogenesis or metabolism.

Suitable weight management agents include macronutrients selected from the group consisting of proteins, carbohydrates, dietary fats, and combinations thereof. Carbohydrates generally comprise sugars, starches, cellulose and gums that the body converts into glucose for energy. Non-limiting examples of carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein below. Dietary fats are lipids comprising combinations of saturated and unsaturated fatty acids. Polyunsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In a particular embodiment, the weight management agents is an herbal extract. Non-limiting examples of plants whose extracts have appetite suppressant properties include plants of the genus *Hoodia, Trichocaulon, Caralluma, Stapelia, Orbea, Asclepias,* and *Camelia.* Other embodiments include extracts derived from *Gymnema Sylvestre,* Kola Nut, *Citrus Auran tium, Yerba Mate, Griffonia Simplicifolia, Guarana,* myrrh, guggul Lipid, and black current seed oil. In a particular embodiment, the herbal extract is derived from a plant of the genus *Hoodia,* species of which include *H. alstonii, H. currorii, H. dregei, H. flava, H. gordonii, H. jutatae, H. mossamedensis, H. officinalis,* H. parviflorai, *H. pedicellata, H. pilifera, H. ruschii,* and *H. triebneri. Hoodia* plants are stem succulents native to southern Africa. In another particular embodiment, the herbal extract is derived from a plant of the genus Caralluma, species of which include *C. indica, C. fimbriata, C. attenuate, C. tuberculata, C. edulis, C. adscendens, C. stalagmifera, C. umbellate, C. penicillata, C. russeliana,* C. retrospicens, *C. Arabica,* and *C. lasiantha.* Carralluma plants belong to the same Subfamily as *Hoodia,* Asclepiadaceae. In another particular embodiment, the at least one herbal extract is derived from a plant of the genus Trichocaulon. Trichocaulon plants are succulents that generally are native to southern Africa, similar to *Hoodia,* and include the species *T. piliferum* and *T. officinale.* In another particular embodiment, the herbal extract is derived from a plant of the genus Stapelia or Orbea, species of which include *S. gigantean* and O. variegate, respectively. Both Stapelia and Orbea plants belong to the same Subfamily as *Hoodia,* Asclepiadaceae. In another particular embodiment, the herbal extract is derived from a plant of the genus *Asclepias. Asclepias* plants also belong to the Asclepiadaceae family of plants. Non-limiting examples of *Asclepias* plants include A. incarnate, A. curassayica, *A. syriaca,* and *A. tuberose.* Not wishing to be bound by any theory, it is believed that the extracts comprise steroidal compounds, such as pregnane glycosides and pregnane aglycone, having appetite suppressant effects. In a particular embodiment, the weight management agent is an exogenous hormone having a weight management effect. Non-limiting examples of such hormones include CCK, peptide YY, ghrelin, bombesin and gastrin-releasing peptide (GRP), enterostatin, apolipoprotein A-IV, GLP-1, amylin, somastatin, and leptin.

In certain embodiments, the osteoporosis management agent is at least one calcium source, i.e. any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof. According to a particular embodiment, the osteoporosis management agent is a magnesium source, i.e. any compound containing magnesium, including salt complexes, solubilized species, and other forms of magnesium. Non-limiting examples of magnesium sources include magnesium chloride, magnesium citrate, magnesium gluceptate, magnesium gluconate, magnesium lactate, magnesium hydroxide, magnesium picolate, magnesium sulfate, solubilized species thereof, and mixtures thereof. In another particular embodiment, the magnesium source comprises an amino acid chelated or creatine chelated magnesium. In other embodiments, the osteoporosis agent is chosen from vitamins D, C, K, their precursors and/or beta-carotene and combinations thereof. Numerous plants and plant extracts also have been identified as being effective in the prevention and treatment of osteoporosis. Not wishing to be bound by any theory, it is believed that the plants and plant extracts stimulates bone morphogenic proteins and/or inhibits bone resorption, thereby stimulating bone regeneration and strength. Non-limiting examples of suitable plants and plant extracts as osteoporosis management agents include species of the genus *Taraxacum* and *Amelanchier*, as disclosed in U.S. Patent Publication No. 2005/0106215, and species of the genus *Lindera, Artemisia, Acorus, Carthamus, Carum, Cnidium, Curcuma, Cyperus, Juniperus, Prunus, Iris, Cichorium, Dodonaea, Epimedium,* Erigonoum, *Soya, Mentha, Ocimum, thymus, Tanacetum, Plantago, Spearmint, Bixa, Vitis, Rosemarinus, Rhus,* and *Anethum,* as disclosed in U.S. Patent Publication No. 2005/0079232.

Examples of suitable phytoestrogens for embodiments of this invention include, but are not limited to, isoflavones, stilbenes, lignans, resorcyclic acid lactones, coumestans, coumestrol, equol, and combinations thereof. Isoflavones belong to the group of phytonutrients called polyphenols. In general, polyphenols (also known as "polyphenolics"), are a group of chemical substances found in plants, characterized by the presence of more than one phenol group per molecule. Suitable phytoestrogen isoflavones in accordance with embodiments of this invention include genistein, daidzein, glycitein, biochanin A, formononetin, their respective naturally occurring glycosides and glycoside conjugates, matairesinol, secoisolariciresinol, enterolactone, enterodiol, textured vegetable protein, and combinations thereof.

Long-chain primary aliphatic saturated alcohols are a diverse group of organic compounds. The term long-chain refers to the fact that the number of carbon atoms in these compounds is at least 8 carbons. Non-limiting examples of particular long-chain primary aliphatic saturated alcohols for use in particular embodiments of the invention include the 8 carbon atom 1-octanol, the 9 carbon 1-nonanol, the 10 carbon atom 1-decanol, the 12 carbon atom 1-dodecanol, the 14 carbon atom 1-tetradecanol, the 16 carbon atom 1-hexadecanol, the 18 carbon atom 1-octadecanol, the 20 carbon atom 1-eicosanol, the 22 carbon 1-docosanol, the 24 carbon 1-tetracosanol, the 26 carbon 1-hexacosanol, the 27 carbon 1-heptacosanol, the 28 carbon 1-octanosol, the 29 carbon 1-nonacosanol, the 30 carbon 1-triacontanol, the 32 carbon 1-dotriacontanol, and the 34 carbon 1-tetracontanol. In a particularly desirable embodiment of the invention, the long-chain primary aliphatic saturated alcohols are policosanol. Policosanol is the term for a mixture of long-chain primary aliphatic saturated alcohols composed primarily of 28 carbon 1-octanosol and 30 carbon 1-triacontanol, as well as other alcohols in lower concentrations such as 22 carbon 1-docosanol, 24 carbon 1-tetracosanol, 26 carbon 1-hexacosanol, 27 carbon 1-heptacosanol, 29 carbon 1-nonacosanol, 32 carbon 1-dotriacontanol, and 34 carbon 1-tetracontanol.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. According to particular embodiments of this invention, non-limiting examples of phytosterols well known to those or ordinary skill in the art include 4-desmethylsterols (e.g., β-sitosterol, campesterol, stigmasterol, brassicasterol, 22-dehydrobrassicasterol, and Δ5-avenasterol), 4-monomethyl sterols, and 4,4-dimethyl sterols (triterpene alcohols) (e.g., cycloartenol, 24-methylenecycloartanol, and cyclobranol).

According to particular embodiments of this invention, non-limiting examples of phytostanols include β-sitostanol, campestanol, cycloartanol, and saturated forms of other triterpene alcohols.

Both phytosterols and phytostanols, as used herein, include the various isomers such as the α and β isomers (e.g., α-sitosterol and β-sitostanol, which comprise one of the most effective phytosterols and phytostanols, respectively, for lowering serum cholesterol in mammals). he phytosterols and phytostanols of the present invention also may be in their ester form. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

Generally, the amount of functional ingredient in the composition varies widely depending on the particular composition and the desired functional ingredient. Those of ordinary skill in the art will readily ascertain the appropriate amount of functional ingredient for each composition.

III. Methods

In one aspect, the present invention provides methods of preparing a beverage of the present invention.

In one embodiment, a method of preparing a beverage comprises mixing a beverage syrup with an appropriate quantity of diluting water. A beverage syrup contains all of the ingredients of the beverage other than the diluting water, e.g. the rebaudioside M or sucrose, siamenoside I and, optionally, other sweeteners, additives or functional ingredients.

In a particular embodiment, the beverage is a carbonated soft drink. In such embodiments, the diluting water is carbonated water. Typically, the volumetric ratio of syrup to diluting carbonated water is between 1:3 to 1:8, such as, for example, between 1:3 and 1:7, between 1:3 and 1:6, between 1:3 and 1:5, between 1:3 and 1:4, between 1:4 and 1:8, between 1:4 and 1:7, between 1:4 and 1:6, between 1:4 and 1:5, between 1:5 and 1:8, between 1:5 and 1:7, between 1:5 and 1:6, between 1:6 and 1:8, between 1:6 and 1:7 and between 1:7 and 1:8. In a particular embodiment, the volumetric ratio of syrup to water is about 1:5.5.

In another embodiment, a method of preparing a beverage comprises dissolving one or more beverage ingredients described herein in a beverage matrix. Beverage ingredients of the present invention include the rebaudioside M or sucrose sweetener, siamenoside I, and optionally, additional sweeteners, additives or functional ingredients.

In a particular embodiment, the beverage matrix comprises citric acid or phosphoric acid.

In another particular embodiment, a method of preparing a beverage comprises dissolving (i) a sweetening amount of rebaudioside M or a sweetening amount of sucrose and (ii) a non-sweetening amount of siamenoside I in (iii) a beverage matrix. The method can further include addition/dissolution of additional sweeteners, additives and/or functional ingredients as described herein.

In another aspect, the present invention provides methods of improving the flavor profile of a beverage.

In one embodiment, a method for improving the flavor profile of a rebaudioside M- or sucrose-sweetened beverage comprises adding siamenoside I in a non-sweetening amount to said beverage. Improvement in the flavor profile means improving (i.e. reducing) one or more negative flavor attributes of the final beverage (comprising siamenoside I) compared to the initial beverage (comprising no siamenoside I). For example, addition of siamenoside I provides one or more of the following: reduced bitterness, reduced astringency, reduced licorice notes, reduced sweetness linger, reduced bitterness linger, reduced bitterness aftertaste, reduced metallic aftertaste or reduced chemical aftertaste.

In another embodiment, a method for providing a more rounded flavor to a rebaudioside M- or sucrose-sweetened beverage comprises adding siamenoside I in a non-sweetening amount to said beverage.

EXAMPLES

Example 1: Mock Beverages

Siamenoside-I (purity ≥95%, lot #951/18/01R, Glyco-Syn), rebaudioside M (lot #RMM0518002 from Pure Circle; total steviolglycoside content 95.02%, rebaudioside M 82.35%, and rebaudioside D 9.40%) and commercial cane sugar (pure cane sugar, Imperial Sugar) were used as sweeteners.

TABLE 1

| Ingredients | Reference 1.5% Sucrose | Test #1 Siamenoside I 20 ppm | Test #2 Siamenoside I 23 ppm | Test #3 Siamenoside I 25 ppm |
|---|---|---|---|---|
| Water | 98.5 | 99.998 | 99.998 | 99.9975 |
| Sucrose granular | 0.15 | — | — | — |
| Siamenoside I | — | 0.002 | 0.0023 | 0.0025 |
| Total (g) | 100 | 100 | 100 | 100 |

For each solution, ingredients were added into carbon-filtered water, mixed until completely dissolved. The solutions (reference, test 1, 2, and 3) were assigned 3-digit numbers, poured into plastic cups and served to experienced panelists at room temperature.

Four experienced panelists bench tasted the solutions blindly. Each panelist was given warm bottled water and unsalted crackers to eat and rinse the palate between samples. Each panelist was given 3 pairs of samples (reference and one test sample) and asked to choose which one is sweeter.

All panelists picked Test 1 and Test 2 as less sweet compared with Reference 1.5% sucrose. All panelists concluded that Test 3 was as sweet as 1.5% sucrose solution. Based on these findings, 23 ppm of Siamenoside I was chosen for further experiments with sucrose and rebaudioside M.

Mock Beverages

1. Mock Citric Acid Beverages

Acidified mock beverages (100 grams) were made using the following ingredients (in grams) in order:

TABLE 2

| Ingredients | Bev. #1 8% Sucrose Reference | Bev. #2 9% Sucrose Reference | Bev. #3 10% Sucrose Reference | Bev. #4 8% Sucrose + 23 ppm Siamenoside I | Bev. #5 280 ppm Rebaudioside M (8% SE) | Bev. #6 280 ppm Rebaudioside M + 23 ppm Siamenoside I |
|---|---|---|---|---|---|---|
| Water | 91.856 | 90.856 | 89.856 | 91.854 | 99.828 | 99.826 |
| Citric acid | 0.117 | 0.117 | 0.117 | 0.117 | 0.117 | 0.117 |
| Sodium citrate | 0.027 | 0.027 | 0.027 | 0.027 | 0.027 | 0.027 |
| Sucrose granular | 8.0 | 9.0 | 10.0 | 80 | — | — |
| Rebaudioside-M | — | — | — | — | 0.028 | 0.028 |
| Siamenoside-I | | | | 0.0023 | | 0.0023 |
| Total | 100 g | 100 g | 100 g | 100 g | 100 g | 100 g |

All ingredients were dissolved in carbon-filtered water and the resulting beverage was filled in 300 ml glass bottles and immediately refrigerated (4° C.). Beverages were bench tasted when cold.

2. Phosphoric Acid Mock Beverages

Acidified mock beverages (100 grams) were made using the following ingredients (in grams) in order:

TABLE 3

| Ingredients | Bev. #5 8% Sucrose Reference | Bev. #6 9% Sucrose Reference | Bev. #7 10% Sucrose Reference | Bev. #8 8% Sucrose + 23 ppm Siamenoside I | Bev. #9 310 ppm Rebaudioside M (8% SE) | Bev. #10 310 ppm Rebaudioside M + 23 ppm Siamenoside I |
|---|---|---|---|---|---|---|
| Water | 91.948 | 90.948 | 89.948 | 91.946 | 99.917 | 99.915 |
| Phosphoric acid (75%) | 0.052 | 0.052 | 0.052 | 0.052 | 0.052 | 0.052 |
| Sucrose granular | 8.0 | 9.0 | 10.0 | 8.0 | — | — |
| Rebaudioside-M | — | — | — | — | 0.0310 | 0.0310 |
| Siamenoside-I | | | | 0.0023 | | 0.0023 |
| Total | 100 g | 100 g | 100 g | 100 g | 100 g | 100 g |

All ingredients were dissolved in carbon-filtered water and the resulting beverage was filled in 300 ml glass bottles and immediately refrigerated (4° C.). Beverages were bench tasted when cold.

Bench Tasting and Results

Four experienced panelists bench tasted the beverages blindly. Each panelist was given warm bottled water and unsalted crackers to eat and rinse the palate between samples. A maximum of 3 samples was tasted at each session to avoid fatigue.

Citric Acid Mock Beverages

All panelists picked beverages with addition of 23 ppm Siamenoside I as best in taste, more balanced and rounded as shown in below panelist comments.

TABLE 4

| Citric Acid Mock Beverages | Panelist Comments |
|---|---|
| Bev. #4 8% Sucrose + 23 ppm Siamenoside-I | Overall sweetness intensity was between 9% and 10% sucrose references. It was more rounded, balanced, and sugar-like taste |
| Bev. #5 280 ppm Rebaudioside-M | Overall sweetness intensity was close to 8% sucrose. There was some sweetness lingering and bitter aftertaste |
| Bev. #6 280 ppm Rebaudioside-M + 23 ppm Siamenoside-I | Overall sweetness intensity was close to 10% sucrose. The bitter aftertaste and sweetness lingering were much reduced. It was more rounded and balanced |

Phosphoric Acid Mock Beverages

TABLE 5

| Phosphoric Acid Mock Beverages | Panelist Comments |
|---|---|
| Bev. #8 8% Sucrose + 23 ppm Siamenoside 1 | Overall sweetness intensity was between 9% and 10% sucrose references. The beverage was more rounded, balanced, and sugar-like taste |
| Bev. #9 310 ppm Rebaudioside M | Overall sweetness intensity was close to 8% sucrose. There was some sweetness lingering and bitter aftertaste at the end |
| Bev. #10 310 ppm Rebaudioside-M + 23 ppm Siamenoside I | Overall sweetness intensity was between 9% and 10% sucrose. The bitter aftertaste and sweetness lingering were much reduced. The beverage was more rounded and balanced |

CONCLUSION

Based on the above findings, low levels of Siamenoside I improved mock beverages with either sucrose or Reb M in terms of sweetness qualities and flavor profile.

Example 2: Lemon-Lime Sweetened Carbonated Beverages

Sucrose-sweetened lemon lime carbonated beverages (100 grams) were made using the following ingredients (in grams):

TABLE 6

| Ingredients | Bev. #1 8% Sucrose Reference | Bev. #2 10% Sucrose Reference | Bev. #3 8% Sucrose + 23 ppm Siamenoside-I |
|---|---|---|---|
| Water | 91.751 | 89.975 | 91.749 |
| Sodium benzoate | 0.018 | 0.018 | 0.018 |
| Citric acid | 0.117 | 0.117 | 0.117 |
| Sodium citrate | 0.027 | 0.027 | 0.027 |
| Lemon lime flavor | 0.087 | 0.087 | 0.087 |
| Sucrose granular | 8.0 | 100 | 8.0 |
| Siamenoside-I | — | — | 0.0023 |
| Total | 100 g | 100 g | 100 g |

The ingredients were dissolved in filtered water to constitute a syrup, then the final beverage was made by weighing the appropriate syrup amount and adding carbonated water using a ratio of 1-part syrup+5.5 parts carbonated water to target a carbonation of 3.8 volumes of $CO_2$. Final beverages were filled in 300 ml glass bottles then aged for 3 days at ambient temperature before they were cooled and served cold (4° C.). Beverage titratable acidity was 0.117% w/v as citric acid.

Lemon-lime carbonated beverages (100 grams) sweetened with Reb M (lot #RMM0518002 from Pure Circle; total steviolglycoside content 95.02%, rebaudioside M 82.35%, and rebaudioside D 9.40%) were made using the following ingredients (in grams):

TABLE 7

| Ingredients | Beverage #4 320 ppm Reb-M (8% SE) Reference | Beverage #5 472 ppm Reb-M (10% SE) Reference | Beverage #6 320 ppm Reb-M + 23 ppm Siamenoside-I | Beverage #7 472 ppm Reb-M +15 ppm Siamenoside-I |
|---|---|---|---|---|
| Water | 99.719 | 99.704 | 99.717 | 99.702 |
| Sodium benzoate | 0.018 | 0.018 | 0.018 | 0.018 |
| Citric acid | 0.117 | 0.117 | 0.117 | 0.117 |
| Sodium citrate | 0.027 | 0.027 | 0.027 | 0.027 |
| Lemon lime flavor | 0.087 | 0.087 | 0.087 | 0.087 |
| Rebaudioside-M | 0.032 | 0.0472 | 0.032 | 0.0472 |
| Siamenoside-I | — | — | 0.0023 | 0.0015 |
| Total | 100 g | 100 g | 100 g | 100 g |

The ingredients were dissolved in filtered water to constitute a syrup, then the final beverage was made by weighing the appropriate syrup amount and adding carbonated water using a ratio of 1-part syrup+5.5 parts carbonated water to target a carbonation of 3.8 volumes of $CO_2$. Final beverages were filled in 300 ml glass bottles then aged for 3 days at ambient temperature before they were cooled and served cold (4° C.). Beverage titratable acidity was 0.117% w/v as citric acid.

Taste Evaluation

Four experienced panelists bench tasted the beverages blindly. Each panelist was given warm bottled water and unsalted crackers to eat and rinse the palate between samples. A maximum of 3 samples was tasted at each session to avoid fatigue. Panelists were asked to evaluate the overall sweetness of the beverage in addition to specific flavor attributes.

All panelists agreed that addition of 23 ppm Siamenoside-I to 8% sucrose (Beverage #3) helped improve the taste by cutting sour notes observed in the reference 8% sucrose.

TABLE 8

| Full Sugar Carbonated Beverages | Panelist Comments |
|---|---|
| Bev. #1 8% Sucrose Reference | Sweet with sour notes at the finish |
| Bev. #2 10% Sucrose Reference | Sweeter than 8% sucrose reference, more rounded |
| Bev. #3 8% Sucrose + 23 ppm Siamenoside-I | Overall sweetness intensity was below 10 sucrose and estimated around 9% sucrose. The flavor was rounded, without sour notes or sweetness lingering |

All panelists agreed that beverages with 23 ppm or 15 ppm Siamenoside I (Bev. #6 and #7) had improved taste, were more balanced and rounded.

TABLE 9

| Diet Carbonated Beverages | Panelist Comments |
|---|---|
| Beverage #4 320 ppm Reb-M Reference | Less sweet compared with reference with 472 ppm reb-M. More sour with some sweetness lingering |
| Beverage #5 472 ppm Reb-M Reference | Overall sweetness intensity was higher than Bev # 4 reference. There was some sweetness lingering, bitterness and licorice aftertaste at the end |
| Beverage #6 320 ppm Reb-M + 23 ppm Siamenoside-I | Sweetness intensity was slightly below reference sample with 472 ppm reb-M. The bitter aftertaste and sweetness lingering were much reduced, and the flavor was more rounded and balanced |
| Beverage #7 472 ppm Reb-M +15 ppm Siamenoside-I | Sweetness intensity was comparable to reference with 472 ppm reb-M. There was no bitterness, licorice aftertaste, or sweetness lingering. The flavor was more rounded with sugar-like taste |

Example 3: Lemon-Ice Black Tea

Sucrose-sweetened lemon ice black tea (100 grams) were made using the following ingredients (in grams):

TABLE 10

| Ingredients | Bev. #1 220 ppm RebM80 Reference | Bev. #2 220 ppm RebM80 + 23 ppm Siamenoside-I |
|---|---|---|
| Water | 99.628 | 99.6257 |
| Citric acid | 0.18 | 0.18 |

TABLE 10-continued

| Ingredients | Bev. #1 220 ppm RebM80 Reference | Bev. #2 220 ppm RebM80 + 23 ppm Siamenoside-I |
|---|---|---|
| Tea powder | 0.12 | 0.12 |
| Flavor | 0.05 | 0.05 |
| RebM | 0.022 | 0.022 |
| Siamenoside-I | 0 | 0.0023 |
| Total | 100 | 100 |

TABLE 11

| Lemon Ice Black Tea Beverages | Panelist Comments |
|---|---|
| Beverage #1 220 ppm Reb-M Reference | Not sweet enough overall yet with long sweetness lingering; lack of full body mouthfeel. |
| Beverage # 2 220 ppm Reb-M + 23 ppm Siamenoside-I | Overall sweetness intensity was higher than Bev # 1 reference. Much more full body mouthfeel, closer to sugar beverage taste. Overall lingering reduced. |

The invention claimed is:

1. A beverage comprising: (i) 50 ppm to 600 ppm rebaudioside M; (ii) 10 ppm to 24 ppm of siamenoside I; and (iii) a beverage matrix comprising citric acid or phosphoric acid.

2. The beverage of claim 1, wherein the rebaudioside M is present in a concentration from about 100 ppm to about 600 ppm.

3. The beverage of claim 1, wherein the rebaudioside M is present in a concentration from about 250 ppm to about 500 ppm.

4. The beverage of claim 1, wherein the rebaudioside M is provided as a steviol glycoside mixture comprising at least 80% rebaudioside M by weight.

5. The beverage of claim 1, wherein the beverage is a carbonated soft drink.

6. The beverage of claim 1, wherein the beverage has less than 5 calories per 8 ounce serving.

7. The beverage of claim 1, wherein the beverage has up to 40 calories per 8 ounce serving.

8. The beverage of claim 1, wherein the beverage is a carbonated beverage.

9. The beverage of claim 8, wherein the carbonated beverage is selected from the group consisting of frozen carbonated beverages, enhanced sparkling beverages, cola, fruit-flavored sparkling beverages, ginger-ale, soft drinks and root beer.

10. The beverage of claim 1, wherein the beverage is non-carbonated.

11. The beverage of claim 10, wherein the beverage is selected from the group consisting of fruit juice, fruit-flavored juice, juice drinks, nectars, vegetable juice, vegetable-flavored juice, sports drinks, energy drinks, enhanced water drinks, enhanced water with vitamins, near water drinks, coconut water, tea type drinks, coffee, cocoa drink, beverage containing milk components, beverages containing cereal extracts and smoothies.

12. The beverage of claim 1, wherein the beverage has an improved flavor profile compared to a corresponding beverage without (ii).

13. The beverage of claim 1, wherein the beverage has a more rounded flavor compared to a corresponding beverage without (ii).

14. A method of preparing of preparing a beverage of claim 1, comprising mixing a beverage syrup with a diluting quantity of water, wherein the beverage syrup comprises (i) rebaudioside M and (ii) siamenoside I; or dissolving (i) rebaudioside M and (ii) siamenoside I in (iii) a beverage matrix.

15. A method of improving the flavor profile of a beverage sweetened with rebaudioside M comprising adding 10 ppm to 24 pm siamenoside I to said beverage, wherein addition of siamenoside I improves one or more flavor attributes of the beverage compared to a corresponding beverage without siamenoside I, wherein the one or more flavor attributes are selected from the group consisting of bitterness, astringency, licorice notes, sweetness linger, bitterness linger, bitterness aftertaste, metallic aftertaste and chemical aftertaste.

16. The beverage of claim 1, wherein the beverage comprises siamenoside I in a concentration from 15 ppm to 24 ppm.

17. The beverage of claim 1, wherein the beverage comprises siamenoside I in a concentration from 20 ppm to 24 ppm.

18. The beverage of claim 1, wherein the siamenoside I is provided a mixture that comprises siamenoside in an amount greater than 95%.

* * * * *